United States Patent [19]

Kolm et al.

[11] Patent Number: 4,615,211

[45] Date of Patent: Oct. 7, 1986

[54] PRESSURE GAUGE FOR TIRES AND OTHER ELASTIC VESSELS

[75] Inventors: Henry H. Kolm, Wayland; Robert E. Carter, Auburndale, both of Mass.

[73] Assignee: Piezo Electric Products, Inc., Cambridge, Mass.

[21] Appl. No.: 684,509

[22] Filed: Dec. 21, 1984

[51] Int. Cl.⁴ .................. B60C 23/02; G01L 9/08
[52] U.S. Cl. .................. 73/146.2; 73/723; 73/DIG. 4
[58] Field of Search ............. 73/146, 146.2, DIG. 4, 73/78, 82, 862.68, 862.65, 777, 723, 726, 727, 588, 582, 573, 706; 338/4; 340/58

[56] References Cited

U.S. PATENT DOCUMENTS

| | | | |
|---|---|---|---|
| 2,057,387 | 10/1936 | Loeb | 340/58 |
| 3,031,591 | 4/1962 | Cary et al. | 73/DIG. 4 |
| 3,198,013 | 8/1965 | Erdely | 73/DIG. 4 |
| 3,337,844 | 8/1967 | Baltakis | 73/753 |
| 3,402,609 | 9/1968 | Chiku et al. | 73/727 |
| 3,624,714 | 11/1971 | Fassrand | 73/727 |
| 3,782,486 | 1/1974 | Kuhn et al. | 177/210 C |
| 3,818,765 | 6/1974 | Eriksen | 73/706 |
| 4,072,056 | 2/1978 | Lee | 73/706 |
| 4,382,377 | 5/1983 | Kleinschmidt et al. | 73/706 |

*Primary Examiner*—Donald O. Woodiel
*Attorney, Agent, or Firm*—Joseph S. Iandiorio; William E. Noonan

[57] ABSTRACT

A pressure gauge including: a deformable element; a rigid guard element surrounding the deformable element to form an engagement face; and means for sensing the deformation of the deformable element as an indication of pressure.

33 Claims, 4 Drawing Figures

PRESSURE GAUGE FOR TIRES AND OTHER ELASTIC VESSELS

FIELD OF INVENTION

This invention relates to a pressure gauge for measuring the internal pressure of a resilient-walled vessel, such as a tire, and more particularly to a gauge for measuring internal pressure without establishing an air connection to the vessel.

BACKGROUND OF INVENTION

Conventional tire gauges require an air connection to the valve stem of the tire, making them cumbersome and time consuming to use. Numerous attempts have been made to measure tire pressure without using an air connection. Some inventions measure the footprint or sidewall bulge of the tire. Many devices involve mechanical sensors built into the wheel to detect tire deformation as the pressure decreases. Others compare angular movements or vertical acceleration of one or more wheels. None of these prior inventions, however, have proved economical or otherwise practical in relation to the conventional tire gauge.

SUMMARY OF INVENTION

It is therefore an object of this invention to provide an improved device for measuring the internal pressure of a tire or other resilient-walled vessel without establishing an air connection to the object.

It is a further object of this invention to provide such a device utilizing the deformation of an element to indicate the internal pressure of a vessel.

It is a further object of this invention to overcome the effects of tire wall tension on the measurement of internal pressure.

It is a further object of this invention to provide a measuring device which is practical, easy to use, reliable, and inexpensive.

The invention results from the realization that the deformation of an element of known area and flexibility can be used to provide a truly effective pressure gauge.

The invention features a pressure gauge including a deformable element, a rigid guard element surrounding the deformable element to form an engagement face, and means for sensing the deformation of the deformable element as an indication of pressure.

In one embodiment the pressure gauge includes processing means for indicating the pressure sensed. The processing means may include a means for displaying the pressure sensed and may also include a means for providing energy, such as a battery. The sensing means may include a piezoelectric element such as a piezoceramic wafer. The piezoceramic wafer has electrodes on two surfaces: preferably one electrode on the side towards the deformable element; and the second electrode on the opposite side.

It is desirable that the deformable element be metal, preferably steel. In one embodiment, the guard element and the deformable element are the same material.

In a preferred embodiment the pressure gauge will also include a contact layer located on the outer surface of the engagement face. The contact layer is a boundary of resilient material, such as silicone rubber, or low-friction material, such as Teflon, which absorbs or otherwise minimizes shear forces caused by the indentation of the vessel wall, thus preventing the impact face from being "pinched" by the vessel indentation. These adverse forces are hereinafter designated pinch forces.

The pressure of a vessel may be measured by passing the vessel slowly over the pressure gauge while the gauge remains in a fixed position, or by bringing the gauge to bear against the vessel. In either case the force applied must be sufficient to deform the vessel wall in the area of the engagement face. The preferred embodiment, accomplished by attaching a handle to the guard element, may be used dynamically to measure internal pressure by forcibly swinging the gauge in an arc to bring the impact face to bear squarely upon the surface of the vessel.

DISCLOSURE OF PREFERRED EMBODIMENT

Other objects, features and advantages will occur from the following description of a preferred embodiment and the accompanying drawings, in which.

Figure 1:
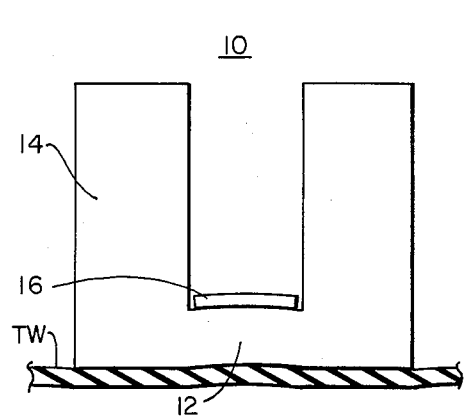
FIG. 1 is a schematic cross-sectional view of a pressure gauge according to this invention, shown engaging a tire wall.

There is shown in FIG. 1 a pressure gauge 10 according to this invention which includes a deformable element 12 of known surface area and flexibility surrounded by a rigid, inflexible guard element 14. The deformable element 12 and the guard element 14 together form an engagement face; that is, the surface that meets a vessel wall. The deformable element and the guard element may be composed of metal. The preferred material for both is steel, wherein the guard element is thicker relative to the deformable element.

The engagement may be achieved by moving either the gauge or the vessel: the gauge could be swung to strike a tire or the tire could be driven onto the gauge. The force required to deform the vessel wall is imparted by a combination of speed and weight of either the gauge or the vessel. Sufficient speed of the gauge is required when the gauge is swung, and sufficient weight to press a tire onto the gauge is needed when the tire is driven over the gauge. The force is sufficient when the vessel wall is deformed to completely cover the engagement face of the gauge.

Pressure gauge 10 is shown engaging tire wall TW in FIG. 1. A sensing means 16 is mounted on the deformable element 12. The sensing means 16, which may include piezoelectric material, measures the strain on the surface of the deformable element, which in turn is determined only by the geometry of the deformable element and the pressure in the vessel by relations well known in mechanical engineering. See *Mark's Handbook for Mechanical Engineers,* for example. Since all resilient-walled vessels exhibit tension, the tension in the vessel wall adds proportionally to the total force experienced by the gauge as the depth of the indentation increases. The measured strain, however, does not depend on the depth of indentation because the guard ring ensures that all tension vectors in the vessel wall lie in the plane parallel to the engagement face so that they cannot contribute to pressure vectors perpendicular to the face.

The present invention involves a means of eliminating the wall tension effects by indenting the tire wall with a guard element and measuring the pressure of only the portion of the wall within the guard element, that is, the portion underlying the deformable element. Only the portion of the wall under the deformable element causes the element to deform; the deformation is then detected by the sensing means. The effect of the guard element 14 upon a tire wall TW is shown in an exaggerated manner in FIG. 1. Note the deformation of deformable element 12.

Figure 2:
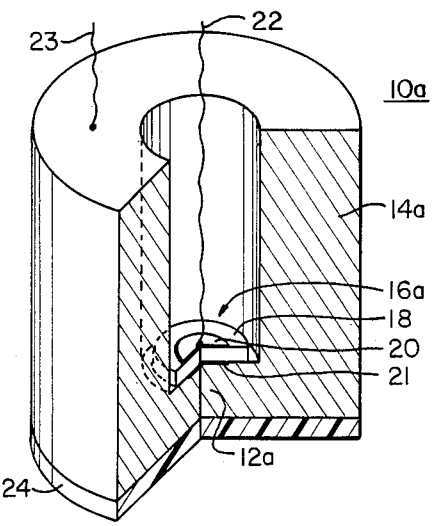
FIG. 2 is a partial cross-sectional view of an alternative embodiment having a contact layer.

An alternative embodiment 10a is depicted in a partial cross-sectional view in FIG. 2. The sensing means 16a includes a piezoceramic wafer 18 having electrodes 20 and 21 on two surfaces, preferably on the upper and lower surfaces as shown in FIG. 2. Electrical connecting means 22 link sensing means 16a to processing means (not shown). If the guard element 14a is composed of an electrically conductive material, such as metal, element 14a can serve as the link between electrode 21 and connecting means 23. If both element 14a and deformable element 12a are electrically conductive, then both may serve as the link, as depicted in FIG. 2.

Pressure gauge 10a further includes a contact layer 24 to minimize pinch forces. Layer 24 may be a resilient elastomer such as silicone rubber which absorbs or cushions shear forces, or a thinner low-friction material such as Teflon. The deformation of the deformable element, and thus the deformation measured by the sensing means, is influenced to the extent that the vessel wall pinches the deformable element. By eliminating pinch forces, the contact layer prevents the engagement face from being pinched by the indentation of the vessel wall and thereby allows the deformable element to respond to the wall as if it were a nearly frictionless surface.

The composition and dimensions of one embodiment of pressure gauge 10a are as follows. The guard element 14a is a cylinder of steel or similar metal approximately one inch in diameter and one inch in length, having a central bore of 0.25 inch in diameter extending to within 0.2 inch of the impact face. Thus deformable element 12a is created having a diameter of 0.25 inch and a thickness of 0.2 inch. The absorptive contact layer 24 is silicone rubber having a thickness of 0.125 inch and a diameter equivalent to that of the impact face. The piezoceramic wafer 18 is a disk with electrodes on both sides and is composed of a PZT piezoceramic, such as ceramic G-1195 made by Piezo Electric Products, Inc., or ceramic PZT-5, made by Vernitron Corporation. The piezoceramic disk is 0.02 inch thick and slightly under 0.25 inch in diameter. The peak electrical output from the piezoceramic disk is typically about 50 millivolts, with a pulse duration of 5 to 10 milliseconds.

Figure 3:
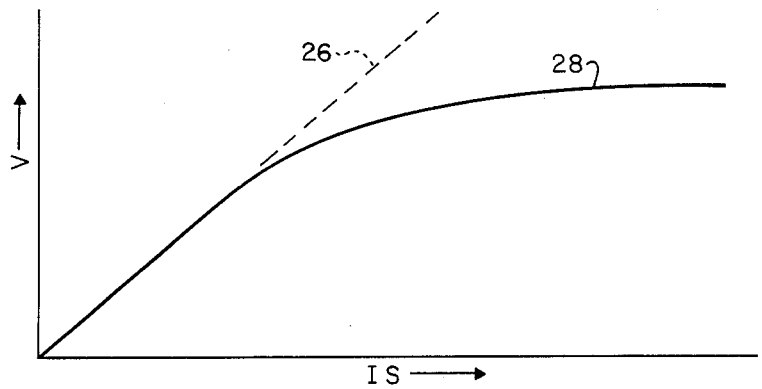
FIG. 3 is an illustration of peak voltage output versus impact speed for a conventional accelerometer and for the pressure sensing means of this invention.

If sensing means 16a includes a piezoceramic wafer 18, as shown in FIG. 2, the deformation of the deformable element 12a causes means 16a to generate a voltage proportional to the deformation of element 12a. If element 12a were rigid and thus incapable of deformation, sensing means 16a functions as a simple accelerometer. The plot of peak voltage output V as a function of impact speed IS for an accelerometer is shown in FIG. 3 as curve 26. As shown, the peak voltage generated increases approximately linearly with impact speed. If element 12a is sufficiently thin and flexible to deform, the peak voltage output of sensing means 16a reaches a saturation value beyond a certain mimimum velocity corresponding to complete engagement as represented by curve 28. The saturation voltage is thus independent of impact speed beyond the minimum velocity and becomes dependent instead on the internal pressure of the vessel. For the manually operated pressure gauge 10b of FIG. 4 to be used effectively, the gauge must therefore be given an impact speed above the minimum velocity of one meter/sec.

To be manually operated, the pressure gauge 10b will be of sufficient weight, six ounces (170 grams), to assure an impact period of sufficient duration for hydrostatic pressures to equalize between the engagement face and the surface of the vessel to be measured when the gauge is swung directly against the vessel. The minimum duration is approximately 5 to 10 milliseconds when gauge 10b is swung against a tire wall.

Figure 4:
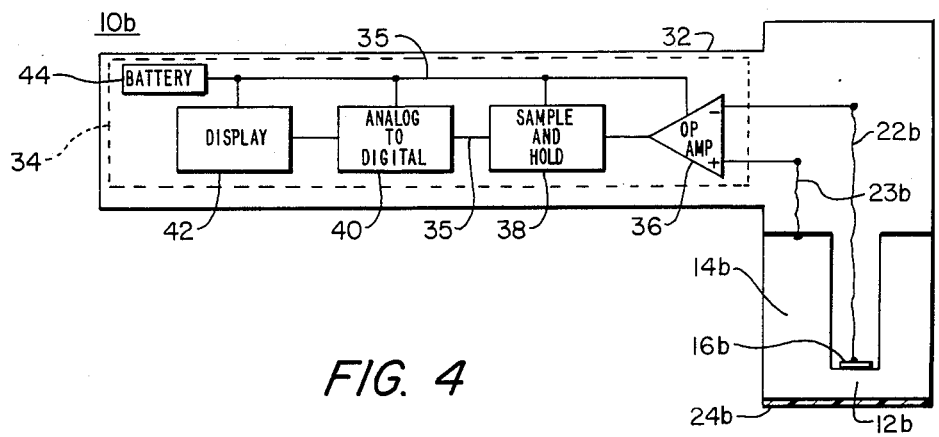
FIG. 4 is a cross-sectional view of yet another embodiment of the invention having a handle which contains the processing means.

The invention may be accomplished with an entirely self-contained impact pressure gauge 10b as depicted in cross-sectional view in FIG. 4. The pressure gauge 10b includes the deformable element 12b, the guard element 14b, the contact layer 24b, and the sensing means 16b. Further included is processing means 34, shown linked to the upper surface of the sensing means 16b by connecting means 22b and to the lower surface by means 23b, guard element 14b and deformable element 12b. Processing means 34 contained within handle 32 includes an operational amplifier 36 responsive to the output from sensor 16b to provide a signal representative of pressure to sample and hold circuit 38. The output of sample and hold circuit 38 is converted by analog to digital converter 40 to a digital signal for display 42. A battery 44 powers the system.

To be entirely self-contained, the pressure gauge 10b will include display means 42 and energy source 44, such as a battery. The components of processing means 34 are shown linked by electrical connecting means 35. Pressure gauge 10b may also be equipped with an ON/OFF switch (not shown).

Other embodiments will occur to those skilled in the art and are within the following claims.

What is claimed is:

1. A pressure gauge which measures the pressure of a resilient-walled vessel by sensing deformation of a wall of the vessel without establishing a connection to the interior of the vessel, comprising:
   a deformable element;
   a rigid guard element surrounding said deformable element to form an engagement face for indenting the wall of the vessel; and
   means for sensing the deformation of said deformable element as an indication of pressure.

2. The pressure gauge of claim 1, further including a contact layer for minimizing pinch forces, said contact layer located on the outer surface of said engagement face.

3. The pressure gauge of claim 2 in which said contact layer is attached to one of the deformable element and the guard element.

4. The pressure gauge of claim 2 in which said contact layer is resilient.

5. The pressure gauge of claim 4 in which said contact layer includes silicone rubber.

6. The pressure gauge of claim 2 in which said contact layer minimizes friction.

7. The pressure gauge of claim 6 in which said contact layer includes Teflon.

8. The pressure gauge of claim 1 in which said deformable element is metal.

9. The pressure gauge of claim 1 in which said deformable element is steel.

10. The pressure gauge of claim 1 in which said guard element and said deformable element are the same material.

11. The pressure gauge of claim 1 in which said sensing means includes a piezoelectric element mounted on said deformable element on the side opposite the engagement face of said deformable element.

12. The pressure gauge of claim 11 in which said piezoelectric element has one electrode means interconnected with at least one of said elements.

13. The pressure gauge of claim 1, further including processing means, responsive to the sensing means, for indicating the pressure sensed by said sensing means.

14. The pressure gauge of claim 13 in which said sensing means includes piezoceramic material having first and second electrode means for interconnection with said processing means.

15. The pressure gauge of claim 14 in which said energy means includes a battery.

16. The pressure gauge of claim 13 in which said processing means includes display means for displaying the sensed pressure.

17. The pressure gauge of claim 16 in which said processing means includes a means for providing energy to said processing means.

18. The pressure gauge of claim 1 further including a handle rigidly attached to the guard element.

19. A pressure gauge comprising: a deformable element; a rigid guard element surrounding said deformable element to form an engagement face; means for sensing the deformation of said deformable element as an indication of pressure; processing means, responsive to the sensing means, for indicating the pressure sensed by said sensing means; and a handle rigidly attached to the guard element and housing said processing means.

20. The pressure gauge of claim 19 further including a contact layer for minimizing pinch forces, said contact layer located on the outer surface of said engagement face.

21. The pressure gauge of claim 20 in which said contact layer is resilient.

22. The pressure gauge of claim 21 in which said contact layer includes silicone rubber.

23. The pressure gauge of claim 20 in which said contact layer minimizes friction.

24. The pressure gauge of claim 23 in which said contact layer includes Teflon.

25. The pressure gauge of claim 19 in which said deformable element is metal.

26. The pressure gauge of claim 25 in which said deformable element is steel.

27. The pressure gauge of claim 19 in which said guard element and said deformable element are the same material.

28. The pressure gauge of claim 19 in which said sensing means includes a piezoelectric element mounted on said deformable element on the side opposite the engagement face of said deformable element.

29. The pressure gauge of claim 28 in which said piezoelectric element has one electrode means interconnected with at least one of said elements.

30. The pressure gauge of claim 28 in which said sensing means includes piezoceramic material having first and second electrode means for interconnection with said processing means.

31. The pressure gauge of claim 19 in which said processing means includes display means for displaying the sensed pressure.

32. The pressure gauge of claim 19 in which said processing means includes means for providing energy to said processing means.

33. The pressure gauge of claim 32 in which said energy means includes a battery.

* * * * *